United States Patent
Shiratama

(10) Patent No.: US 6,751,422 B2
(45) Date of Patent: Jun. 15, 2004

(54) SPATIAL LIGHT COMMUNICATION EQUIPMENT COMPRISING ANGLE ERROR DETECTION AND ALIGNMENT UNITS

(75) Inventor: Koichi Shiratama, Tokyo (JP)

(73) Assignee: NEC Toshiba Space Systems, Ltd., Kanagawa (JP)

( * ) Notice: Subject to any disclaimer, the term of this patent is extended or adjusted under 35 U.S.C. 154(b) by 505 days.

(21) Appl. No.: 09/767,209

(22) Filed: Jan. 22, 2001

(65) Prior Publication Data

US 2001/0009466 A1 Jul. 26, 2001

(30) Foreign Application Priority Data

Jan. 20, 2000 (JP) .......... 2000-011338

(51) Int. Cl.⁷ .......... H04J 14/02; H04B 10/00; H04B 10/02; H04B 10/12; H04B 10/06
(52) U.S. Cl. .......... 398/156; 398/88; 398/122; 398/131; 398/201; 398/207; 398/128
(58) Field of Search .......... 359/34, 114, 115, 359/130, 196, 197, 209, 210, 212, 214, 220, 221, 223, 307, 354, 362, 355, 366, 380, 515, 528, 838, 642; 398/88, 156, 201, 207, 118–131; 455/427, 12.1

(56) References Cited

U.S. PATENT DOCUMENTS

| | | | | |
|---|---|---|---|---|
| 3,864,634 A | * | 2/1975 | Dragonetti | 455/265 |
| 3,902,036 A | * | 8/1975 | Zaleckas | 219/121.76 |
| 4,867,560 A | * | 9/1989 | Kunitsugu | 356/139.05 |
| 4,888,816 A | * | 12/1989 | Sica, Jr. | 389/119 |
| 4,957,362 A | * | 9/1990 | Peterson | 356/5.14 |
| 4,972,151 A | * | 11/1990 | Rosen | 324/354 |
| 5,142,400 A | * | 8/1992 | Solinsky | 398/129 |
| 5,216,480 A | * | 6/1993 | Kaneko et al. | 356/139.06 |
| 5,418,638 A | * | 5/1995 | Hirasawa | 359/197 |
| 5,684,614 A | * | 11/1997 | Degura | 398/131 |
| 5,748,315 A | * | 5/1998 | Kawai et al. | 356/484 |
| 5,793,912 A | * | 8/1998 | Boord et al. | 385/37 |
| 5,883,730 A | * | 3/1999 | Coult et al. | 398/129 |
| 6,091,528 A | * | 7/2000 | Kanda | 398/122 |
| 6,178,024 B1 | * | 1/2001 | Degura | 398/129 |
| 6,384,944 B1 | * | 5/2002 | Takayama et al. | 398/135 |
| 6,493,122 B1 | * | 12/2002 | Degura | 398/128 |
| 6,590,685 B1 | * | 7/2003 | Mendenhall et al. | 398/121 |
| 6,618,177 B1 | * | 9/2003 | Kato et al. | 398/129 |
| 2002/0080452 A1 | * | 6/2002 | Sakanaka | 359/172 |

* cited by examiner

Primary Examiner—Jason Chan
Assistant Examiner—Alex Chan
(74) Attorney, Agent, or Firm—Dickstein, Shapiro, Morin & Oshinsky, LLP.

(57) ABSTRACT

A spatial light communication equipment being capable of providing compatibility between two communication equipments placed opposite to each other and of providing, with simplified configurations, highly accurate seizure and tracking capability and excellent beam directivity for ultra-long-distance communication. Angular error in a receiving beam is detected by an angle detector disposed on an optical axis of light reflected by a first reflecting plane of a beam deflector and, based on detected results, an angle deflected by the beam deflector is corrected. The deflected angle of a transmitting beam is controlled by using a second reflecting plane which is a back-surface of the first reflecting plane of the beam deflector and an error being equivalent to angular error occurring in the receiving beam is accurately corrected to obtain correct direction of emittance of the transmitting beam by using a signal transmitting optical antenna having same magnification as signal receiving optical antenna has and having polarity being opposite to the signal receiving optical antenna.

16 Claims, 4 Drawing Sheets

SPATIAL LIGHT COMMUNICATION EQUIPMENT COMPRISING ANGLE ERROR DETECTION AND ALIGNMENT UNITS

BACKGROUND OF THE INVENTION

1. Field of the Invention

The present invention relates to a spatial light communication equipment for spatially transmitting optical signals and more particularly to the spatial light communication equipment which can be used suitably for ultra-long-distance spatial optical communications such as intersatellite optical communications.

The present application claims priority of Japanese Patent Application No.2000-011338 filed on Jan. 20, 2000, which is hereby incorporated by reference.

2. Description of the Related Art

An information transmitting system using optical signals includes, in addition to a wired transmission system through an optical fiber being featured by non-inductive, low-loss and wide-band optical transmission, a spatial transmitting system using spatial light such as infrared rays. The spatial transmitting system, though it is of lower quality of transmission than the wired transmission system, can provide low-cost and highly practical communication simply by installing a spatial light communication equipment enabling communication by spatial light on transmitting side and receiving side within an unobstructed spatial range. The spatial transmission system is very advantageous in ultra-long-distance communication which costs much to install wired transmission lines such as optical fibers and/or in intersatellite optical communications in which installation of wired transmission lines is impossible, in particular.

To carry out communications using spatial light, the spatial light communication equipment installed on a transmitting side is placed opposite to one installed on a receiving side and a spatial light receiving communication equipment (hereinafter may be referred to as a receiver) receives spatial light emitted by a spatial light transmitting communication equipment (hereinafter may be referred to as a transmitter). In the case of intersatellite optical communications being ultra-long-distance communication, since the spatial light to be emitted is a light beam having directivity as sharp as about $10\mu$ rad, seizure/tracking capability and beam directivity with accuracy of about 1 $\mu$rad are required to receive the emitted beams of light.

FIG. 8 is a schematic block diagram for showing configurations of a conventional spatial light communication equipment. In this spatial light communication equipment, communications are carried out by using transmitting and receiving beams which are transmitted or received on a same optical axis between the transmitter and the receiver. A beam emitted from the transmitter (not shown) is received by an optical antenna 10 of the receiver. The beam received by the optical antenna 10 is transmitted to a beam deflector 11. The beam deflector 11 totally reflects only the beam received through the optical antenna 10 and guides it toward a beam splitter 12. On an optical axis of the beam totally reflected by the beam deflector 11 are placed the beam splitter 12, a beam splitter 13 and an angle detector 14. The beam splitter 12 allows the beam totally reflected by the beam deflector 11 to pass through itself. The beam splitter 13 allows the beam transmitted through the beam splitter 12 to pass through itself and then outputs the beam to the angle detector 14 and, at a same time, guides the beam toward an optical receiver 15. The angle detector 14 detects an angle of deviation, relative to an optical axis of the beam totally reflected by the beam deflector 11, of the beam transmitted through the beam splitter 13. The optical receiver 15 converts the beam guided by the beam splitter 13 to an electrical signal and performs predetermined signal receiving processing.

On the other hand, since direction in which the optical antenna 10 is directed to the spatial light communication equipment (not shown) installed on the opposite side is displaced by an angle of deviation detected by the angle detector 14, a transmitting signal to be transmitted to the receiver is emitted with the angle of deviation being corrected. At this point, transmitting signal to be transmitted by an optical transmitter 16 is converted to an transmitting beam as an optical signal and is output to the beam splitter 12. The beam splitter 12 guides the transmitting beam fed by the optical transmitter 16 toward the beam deflector 11. The beam deflector 11, by using a control section (not shown), is adapted to improve signal receiving sensitivity of the optical receiver 15. The beam deflector 11 also controls a deflected angle depending on angle of deviation detected by the angle detector 14 so that a direction of the transmitting beam fed by the optical antenna 10 directed to the receiver is corrected by the angle of deviation. The beam deflector 11 totally reflects the beam fed from the beam splitter 12 and guides it toward the optical antenna 10. The optical antenna 10 transmits the beam from the beam deflector 11 to the receiver.

Thus, in the spatial light communication equipment by which communication is carried out by transmitting and receiving the beam on the same optical axis between the transmitter and receiver, by controlling an angle of the beam deflected by the beam deflector 11, the corrected angle detected at a time of tracking the receiving beam is applied to adjustment of directions of the transmitting beam. This enables sharp directivity of beam light in the spatial light communication equipment to be implemented, with simplified configurations.

FIG. 9 is a schematic block diagram showing configurations of a conventional spatial light communication equipment in which communication is carried out using signal transmitting and receiving beams being transmitted on different optical axes. The spatial light communication equipment of this type is provided with one optical antenna for transmitting beams and another optical antenna for receiving beams to carry out communication using beams to be transmitted and received on the different optical axes between the transmitter and receiver. Therefore, a receiving beam transmitted from the transmitter is received by a signal receiving optical antenna 20. The receiving beam received by the signal receiving optical antenna 20 is output to a beam deflector 21. The beam deflector 21 totally reflects only the receiving beam fed from the signal receiving optical antenna 20 and guides them toward a beam splitter 22. On an optical axis of the receiving beam totally reflected by the beam deflector 21 are placed the beam splitter 22 and an angle detector 23. The beam splitter 22 allows the receiving beam totally reflected by the beam deflector 21 to pass through itself to output to the angle detector 23 and, at a same time, guides the beam toward an optical receiver 24. The angle detector 23 detects an angle of deviation, relative to an optical axis of the beam totally reflected by the beam deflector 21, of the beam transmitted through the beam splitter 22. The optical receiver 24 converts the beam guided by the beam splitter 22 to an electrical signal and performs predetermined signal receiving processing The spatial light communication equipment shown in FIG. 9 is provided with a control section (not shown) adapted to change the angle deflected by the beam deflector 21 depending on the angle of deviation of the transmitted light beam detected by the angle detector 23 in order to improve signal receiving sensitivity of the optical receiver 24. An amount of the corrected angle changed by the control section is monitored by an angle transferring circuit 25 and is transferred, with high accuracy, to a beam deflector 26.

A transmitting signal to be transmitted from the spatial light communication equipment is converted to an optical signal by an optical transmitter 27 and is output to the beam deflector 26. The beam deflector 26 totally reflects only specified beam component in the transmitting beams and guides them to a mirror 28. The mirror 28 guides the transmitting beam totally reflected by the beam deflector 26 toward a signal transmitting optical antenna 29. The signal transmitting optical antenna 29 transmits out the transmitting beam totally reflected by the mirror 28 to a receiver (not shown).

Thus, in the spatial light communication equipment by which communication is carried out by transmitting the signal transmitting and receiving beams on the different optical axes between the transmitter and receiver, by controlling the angle of the beam deflected by the beam deflector on the beam receiving side based on the corrected angle corresponding to results from tracking of receiving beams, the controlled amount of the corrected angle is applied, with high accuracy, to adjustment of directions of the transmitting beam by the beam deflector. This enables highly accurate tracking capability of the receiving beam and sharp directivity of the transmitting beam to be implemented.

However, in the conventional spatial light communication equipment shown in FIG. 8, since communication is carried out by transmitting and receiving beams on the same optical axis, identification between the transmitting beam and receiving beam is generally made by a wavelength or a direction of a polarized wave. Therefore, when the identification is made by the wavelength, if, in one spatial light communication equipment, a beam of light having a wavelength of $\lambda_1$ is used as the transmitting spatial light to be transmitted and a beam of light having a wavelength of $\lambda_2$ as the receiving spatial light to be received, in the other spatial light communication equipment, the beam of light having a wavelength of $\lambda_2$ and the beam of light having a wavelength of $\lambda_1$ must be used as the transmitting spatial light and as the receiving spatial light respectively. That is, since one spatial light communication equipment cannot be used as a substitute for the other, it is impossible to maintain compatibility.

Moreover, to implement the compatibility between the two spatial light communication equipments disposed opposite to each other, since the transmitting beam and receiving beam use a beam of light having same wavelength or same polarized wave, a filter to separate a wavelength component and a polarized wave component contained in the light same wavelength and polarized wave has to be additionally installed. To carry out ultra-long-distance spatial light communications, a dynamic range between a transmitting spatial light level and a receiving spatial light level of the spatial light communication equipment has to be widened. However, when the filter for separation of the wavelength component and polarized wave component is mounted, since a crosstalk of the transmitting spatial light in the spatial light communication equipment cannot be removed due to unavoidable factors such as feedback light, it becomes impossible to widen the dynamic range.

On the other hand, in the conventional spatial light communication equipment shown in FIG. 9, since communication is carried out by transmitting and receiving beams on different optical axes, it is possible to ensure compatibility between two spatial light communication equipments disposed opposite to each other. However, a beam deflector for a receiving beam and a beam deflector for a transmitting beam have to be installed separately and, after having detected an amount of corrected angle in tracking of the receiving beam, control has to be made so as to transfer, with high accuracy, the amount of the corrected angle to the beam deflector for the transmitting beam, thus causing complicated control configurations and an increased size of the conventional spatial light communication equipment.

SUMMARY OF THE INVENTION

In view of the above, it is an object of the present invention to provide a spatial light communication equipment being capable of providing compatibility between two spatial light communication equipments placed opposite to each other and of providing, with simplified configurations, highly accurate seizure and tracking capability and excellent beam directivity for ultra-long-distance communication.

According to a first aspect of the present invention, there is provided a spatial light communication equipment including:

a first optical antenna to receive receiving spatial light from a spatial light communication equipment installed on an opposite side;

a angle detector for detecting an angular error from a specified signal receiving optical axis from the receiving spatial light received by the first optical antenna;

a controller (correcting means) for correcting, based on the angular error detected by the angle detector, the angular error of the receiving spatial light from the specified signal receiving optical axis and angular error of transmitting spatial light to be emitted to the spatial light communication equipment installed on the opposite side; and a second optical antenna to transmit the transmitting spatial light whose angular error has been corrected by the controller (correcting means).

In the above configuration, the angular error of the receiving spatial light emitted from the spatial light communication equipment installed on the opposite side and received by the first optical antenna, from the specified signal receiving optical axis, is detected and the angular error of the receiving spatial light and the angular error of the transmitting spatial light to be emitted to the spatial light communication equipment installed on the opposite side are corrected by the controller (correcting means). Polarity of the transmitting spatial light whose angular error has been corrected is reversed by the second optical antenna and is transmitted to the spatial light communication equipment installed on the opposite side.

With the above configuration, since an amount of the angular error of the receiving spatial light is used for controlling direction of the transmitting spatial light, the spatial light communication equipment in which both tracking and seizure of the receiving spatial light and the control on the direction of the transmitting spatial light are made possible, with simplified structures, can be implemented.

According to a second aspect of the present invention, there is provided a spatial light communication equipment including:

a first optical antenna to receive receiving spatial light from a spatial light communication equipment installed on an opposite side;

a beam deflector having a first reflecting plane to deflect the receiving spatial light received by the first optical antenna on a specified optical axis;

an angle detector for detecting an angular error of the receiving spatial light deflected on the specified optical axis;

a controller for correcting, based on the angular error detected by the angle detector, an angle deflected by the beam deflector;

a reflector for guiding transmitting spatial light toward the specified optical axis of the receiving spatial light to be emitted to the spatial light communication equipment installed on the opposite side, corrected by the controller and reflected by a second reflecting plane being positioned on a back-surface of the first reflecting plane of the beam deflector; and a second optical antenna to reverse a polarity of the transmitting spatial light reflected by the reflector and to transmit the transmitting spatial light to the spatial light communication equipment installed on the opposite side.

In the above configuration, the angular error of the receiving spatial light fed from the spatial light communication equipment installed on the opposite side and received by the first optical antenna is detected after having been deflected on the specified optical axis by the first reflecting plane of the beam deflector and then the deflected direction is corrected by the controller. The transmitting spatial light to be emitted to the spatial light communication equipment installed on the opposite side is reflected by the second reflecting plane of the reflector which is positioned on the back-surface of the first reflecting plane of the beam deflector whose deflecting direction has been corrected by the controller and is then guided toward the specified optical axis of the receiving spatial light by the reflector and is transmitted, with its polarity reversed by the second optical antenna, to the spatial light communication equipment installed on the opposite side.

With the above configuration, a spatial separation between the signal transmitting and receiving beams within the spatial light communication equipment and complete blocking of invasion of crosstalk of the transmitting beam into the signal receiving system can be achieved, with very simplified configurations, thus implementing a spatial light optical communication system requiring no considerations about allotment of wavelength component and/or polarized wave component. Also, by transmitting the signal transmitting and receiving beams on different optical axes, light having a same wavelength and same polarized component can be used between the transmitter and receiver, thus ensuring compatibility of the spatial light communication equipment.

Furthermore, by using both the surface reflecting plane and rear reflecting plane of the beam deflector, the deflected angle to be corrected can be transferred under a well controlled condition, enabling highly accurate tracking and seizure capability and controlled directivity of the signal light. Therefore, the spatial light communication equipment can be used for ultra-long-distance spatial optical communications requiring highly accurate tracking and seizure capability and controlled directivity of the signal light such as the intersatellite optical communications. By incorporating a light source having a high signal transmitting level and an optical receiver having high signal receiving sensitivity into the spatial light communication equipment, very excellent intersatellite optical communication system can be constructed.

According to a third aspect of the present invention, there is provided a spatial light communication equipment including:

a first optical antenna to receive receiving spatial light from a spatial light communication equipment installed on an opposite side;

a beam deflector having a first reflecting plane to deflect the receiving spatial light received by the first optical antenna on a specified optical axis;

an angle detector for detecting an angular error of the receiving spatial light deflected on the specified optical axis;

a controller for correcting, based on the angular error detected by the angle detector, an angle deflected by the beam deflector; and a second optical antenna having a polarity being opposite to that of the first optical an antenna including a concave lens to expand a diameter of the transmitting spatial light to be emitted to the spatial light communication equipment installed on the opposite side, corrected by the con-roller and reflected by a second reflecting plane being positioned on a back-surface of the first reflecting plane of the beam deflector, a reflector to guide the transmitting spatial light whose diameter has been expanded by the concave lens toward the specified optical axis of the receiving spatial light and a convex lens to collimate the transmitting spatial light reflected by the reflector and to transmit out the transmitting spatial light.

In the above configuration, the second optical antenna is so configured that the reflector to guide the transmitting spatial light toward the specified optical axis of the receiving spatial light is disposed between a Galileian-type concave lens used to reverse polarity of the transmitting spatial light and to expand beam diameter and the convex lens to collimate the transmitting spatial light.

With the above configuration, since the concave lens making up the second optical antenna is disposed as near to the second reflecting plane of the beam deflector as possible, the reflected light can be handled in vicinity of a center area where aberration of the concave lens is small and further its lens diameter can be made smaller. Therefore, transmitting accuracy of the transmitting spatial light can be improved and size of the spatial light communication equipment itself can be made smaller.

According to a fourth aspect of the present invention, there is provided a spatial light communication equipment including:

a first optical antenna to receive receiving spatial light from a spatial light communication equipment installed on an opposite side;

a beam deflector having a first reflecting plane to deflect the receiving spatial light received by the first optical antenna on a specified optical axis;

an angle detector for detecting an angular error of the receiving spatial light deflected on the specified optical axis;

a controller for correcting, based on the angular error detected by the angle detector, an angle deflected by the beam deflector;

a second optical antenna to reverse a polarity of transmitting spatial light to be emitted to the spatial light communication equipment installed on the opposite side, corrected by the controller and reflected by a second reflecting plane being positioned on a back-surface of the first reflecting plane of the beam deflector, and a reflector to guide the transmitting spatial light transmitted by the second optical antenna toward the specified optical axis of the receiving spatial light.

In the above configuration, the angular error of the receiving spatial light fed from the spatial light communication equipment installed on the opposite side and received by the first optical antenna is detected after the receiving spatial light has been deflected on the specified optical axis by the first reflecting plane of the beam deflector and deflected direction is corrected by the controller. Then, the transmitting spatial light to be transmitted to the spatial light communication equipment installed on the opposite side is reflected by the second reflecting plane being the back-surface of the first reflecting plane of the beam deflector whose deflecting direction has been corrected by the controller and, after its polarity is reversed by the second optical antenna and is emitted, is guided to the specified optical axis of the receiving spatial light by the reflector.

With the above configuration, since the lens making up the second optical antenna is disposed as near to the second reflecting plane of the beam deflector as possible, the reflected light can be handled in vicinity of a center area where aberration of the lens is small and further its lens diameter can be made smaller. Moreover, since commercially available signal transmitting optical antenna can be appropriated, costs for the spatial light communication equipment can be reduced.

In the foregoing, a preferable mode is one wherein the first optical antenna and the beam deflector are so disposed that an exit pupil of the receiving spatial light received by the first optical antenna is positioned on the first reflecting plane of the beam deflector.

In the above configuration, since the exit pupil of the receiving spatial light received by the first optical antenna is disposed on the first reflecting plane of the beam deflector, the specified optical axis deflected by the beam deflector can be held in a constant position.

With the above configuration, very highly accurate control on the spatial light can be achieved.

Furthermore, a preferable mode is one wherein the first and second optical antennas are operated under a same magnification and they receive and transmit spatial light having a same diameter.

In the above configuration, since the diameter of the spatial light transmitted and received by each of the first and second optical antennas is the same, compatibility between the transmitter and receiver can be further improved.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
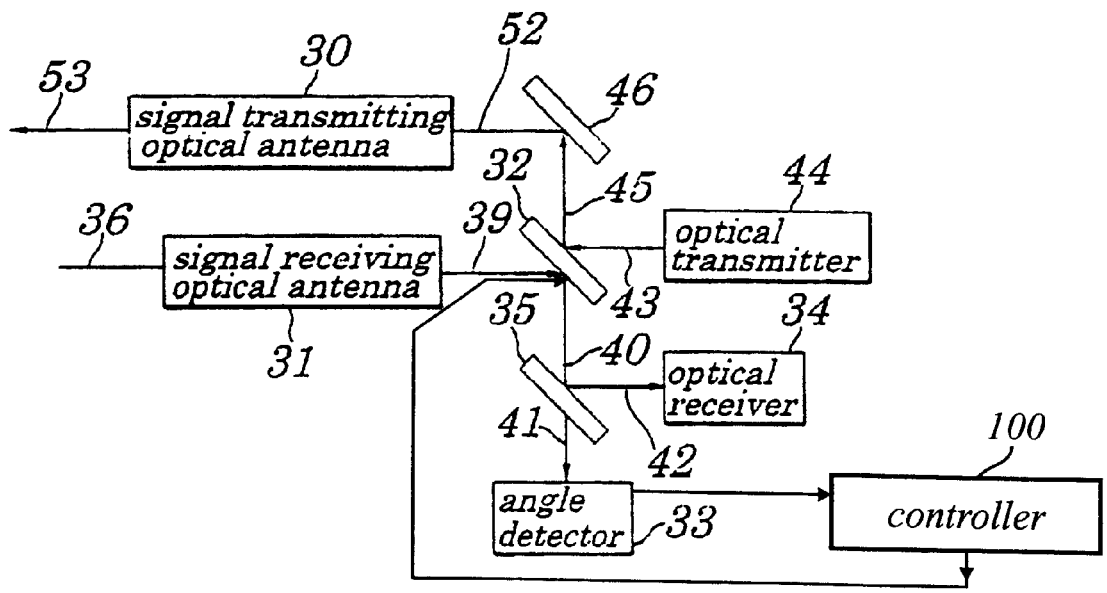
FIG. 1 is a schematic block diagram of configurations of a spatial light communication equipment according to a first embodiment of the present invention.

FIG. 1 is a schematic block diagram of configurations of a spatial light communication equipment according to a first embodiment of the present invention. The spatial light communication equipment of the first embodiment is provided with a signal transmitting optical antenna 30 and a signal receiving optical antenna 31 to carry out optical communications by transmitting the signal transmitting and receiving beams on the different optical axes between the transmitter and receiver. The spatial light communication equipment according to the first embodiment is featured by use of a second reflecting plane mounted on a surface being opposite to a first reflecting plane of a beam deflector 32 used to correct an angle of deviation of the receiving beam 36 received by the signal receiving optical antenna 31 as a plane of reflection to correct a direction of a transmitting beam 53.

Configurations and operations of the spatial light communication equipment of the first embodiment will be hereinafter described by referring to FIG. 1.

The spatial light communication equipment of the first embodiment includes the signal transmitting optical antenna 30 and the signal receiving optical antenna 31, the beam deflector 32 to totally reflect a receiving beam received by the signal receiving optical antenna 31 by using the first reflecting plane of the beam deflector 32, a bean splitter 35 to split the receiving beam 36 totally reflected by the first reflecting plane of the beam deflector 32 into a beam incident on an angle detector 33 and into a beam incident on an optical receiver 34.

Figure 2:
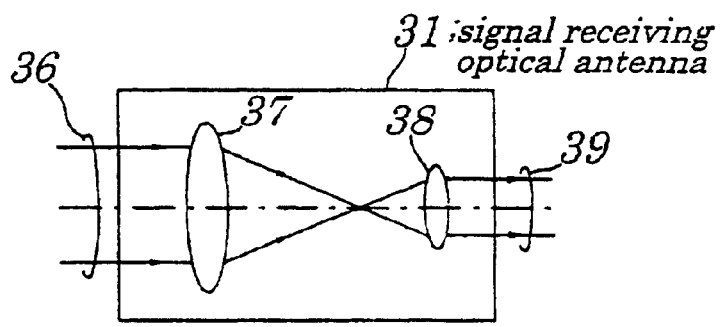
FIG. 2 is a diagram showing configurations of main parts of a signal receiving optical antenna according to the first embodiment.

FIG. 2 is a diagram showing configurations of main parts of the signal receiving optical antenna 31 according to the first embodiment. The signal receiving optical antenna 31 has a first convex lens 37 and a second convex lens 38 on an optical axis, each having a different diameter. The diameter of the first convex lens 37 is larger than that of the second convex lens 38. The signal receiving optical antenna 31 is a Keplerian-type optical device having a negative magnification adapted to gather receiving beams 36 emitted from the transmitter and outputs collimated light 39. The signal receiving optical antenna 31 having configurations as above is disposed so that a position of an exit pupil coincides with the first reflecting plane being one plane of reflection of the beam deflector 32. This enables an optical axis of reflected light 40 reflected by the first reflecting plane of the beam deflector 32 to be held in a constant position, irrespective of an incident angle of the receiving beams 36 received by the signal receiving optical antenna 31.

Angle deflected by the beam deflector 32 can be controlled by, for example, mechanically changing an angle of placement of the beam deflector 32 itself. On the optical axis of the reflected light 40 produced by total reflection of the collimated light 39 on the first reflecting plane are displaced the beam splitter 35 and the angle detector 33.

The beam splitter 35 allows the reflected light 40 to pass through itself and to output it to the angle detector 33 and, at a same time, guides the reflected light 40 toward the optical receiver 34.

Reflected light 41 transmitted through the beam splitter 35 is incident on a light receiving device having specifically divided segments of the angle detector 33. The angle detector 33 detects a direction of the optical axis of the receiving beam 36 based on a distribution state of received power detected at each of the above segments of the light receiving device.

The optical receiver 34 performs predetermined signal receiving processing on reflected light 42 guided by the beam splitter 36 to detect transmitted received signals. A controller 100, based an amount of angular error from a predetermined reference angle in direction of the optical axis of the receiving beam 36 detected by the angle detector 33, controls angle deflected by the beam deflector 32 and changes the direction of the optical axis of the reflected light 40 so that the reflected light 41 is incident on a center of the angle detector 33.

Moreover, the spatial light communication equipment of the first embodiment is provided with an optical transmitter 44 to convert an electric signal to be transmitted to a receiver installed on an opposite side to an optical signal and to emit collimated transmitting spatial light 43 to the second reflecting plane mounted on an opposite side of the first reflecting plane of the beam defector 32 adapted to reflect the collimated light 39 fed from the signal receiving optical antenna 31 and with a mirror 46 to totally reflect light 45 which has been totally reflected by the second reflecting plane of the beam deflector 32, toward the signal transmitting optical antenna 30. The light reflected by the mirror 46 is incident on the signal transmitting optical antenna 30.

Figure 3:
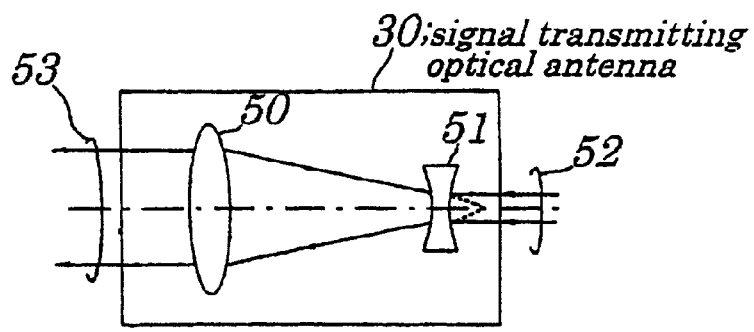
FIG. 3 is a diagram showing configurations of main parts of a signal transmitting optical antenna according to the first embodiment.

FIG. 3 is a diagram showing configurations of main parts of the signal transmitting optical antenna 30 according to the first embodiment. The signal transmitting optical antenna 30 has a convex lens 50 and a concave lens 51 or an optical axis. The concave lens 51 is disposed on a light incidence side and the convex lens 50 is disposed on a light emittance side. The light 52 totally reflected by the mirror 46 is incident on the concave lens 51. The signal transmitting optical antenna 30 is a Galileian-type optical device having a positive magnification adapted to expand a beam diameter under a same magnification as is applied to the signal receiving optical antenna 31 and to emit a transmitting beam 53 having sharp directivity. These two signal transmitting and receiving optical antennas 30 and 31 are of opposite polarity.

In the spatial light communication equipment having such configurations of the first embodiment, when the receiving beam 36 received by the signal receiving optical antenna 31 is gathered to be collimated, an angular error from its original signal receiving optical axis is apt to occur due to misalignment of a device or disturbance such as a vibration.

To solve this problem, the spatial light communication equipment of the first embodiment is so configured that only predetermined beam component contained in the collimated light 39 is reflected by the first reflecting plane of the beam deflector 32 and a feedback control on the angle deflected by the beam deflector 32 is performed by the controller 100 using an angular error signal detected by the angle detector 33 disposed on the optical axis of reflected light. By configuring as above, since the optical axis of the receiving beam 36 is tracked and controlled so that the reflected light 41, which has been reflected by the first reflecting plane of the beam deflector 32 and has been deflected at a predetermined angle, is incident on center of the angle detector 33, signal receiving sensitivity of the optical receiver 34 is improved and the receiving beam received by the signal receiver 34 is made stable.

On the other hand, collimated transmitting spatial light 43 produced and collimated by the optical transmitter 44 is incident on the second reflecting plane which is a back-surface of the first reflecting plane of the beam deflector 32. In the beam deflector 32, since the angular error of the receiving spatial light from the optical axis is corrected, an angular error from the optical axis of the receiving spatial light being parallel to the optical axis of the receiving spatial light is naturally corrected. Therefore, the transmitting spatial light is made incident by the mirror 46 on the signal transmitting optical antenna 30 with the angular error corrected.

An angular direction corrected by the second reflecting plane of the beam deflector 32 is symmetric with respect to a direction of an angular displacement of the collimated light 39 collimated by the signal receiving optical antenna 31 and is in a direction opposite to the direction of the angular displacement of the collimated light 39.

Figure 4:
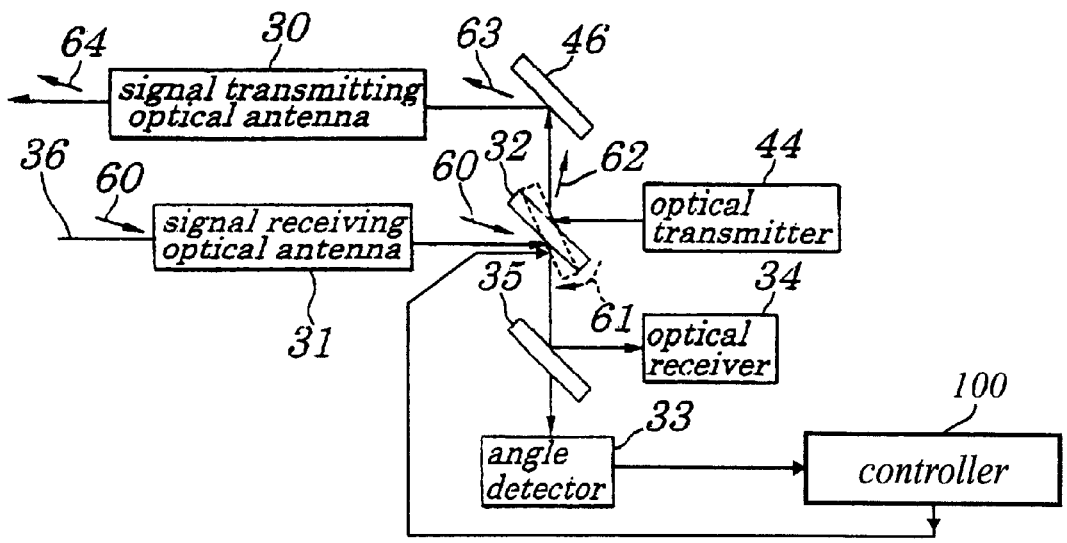
FIG. 4 is a schematic block diagram illustrating angular directions corrected by each of reflecting planes of a beam deflector according to the first embodiment.

FIG. 4 is a schematic block diagram illustrating angular directions corrected by each of reflecting planes of the beam deflector 32. In FIG. 4, same reference numbers are assigned to parts having same functions as those in the spatial light communication equipment as shown in FIG. 1 and descriptions of them are omitted accordingly. When the angle detector 33 detects displacement of the receiving beam 36 received by the signal receiving optical antenna 31, relative to the signal receiving optical axis, toward a direction shown by an arrow 60, that is, toward a direction in which an angle of incidence on the first reflecting plane of the beam deflector 32 is made smaller, the controller 100 changes a placement angle of the beam deflector 32 toward a direction shown by an arrow 61 so that a deflection angle of the beam deflector 32 is corrected. This causes the beam deflector 32 to be placed at an angle indicated by dashed lines wile it receives signal transmitting collimated light from the optical transmitter 44.

Thus, since the angle deflected by the beam deflector 32 relative to the signal receiving optical axis, has been corrected, signal transmitting collimated light fed from the optical transmitter 44 is made incident on the second reflecting plane of the beam deflector 32 in a direction in which an angle of incidence on the second reflecting plane of the beam deflector 32 is made larger. Therefore, the light reflected by the second reflecting plane of the beam deflector 32 is reflected toward a direction shown by an arrow 62, that is, toward a direction in which an angle of incidence on the mirror 46 is made larger when compared with that provided before change by the controller 100. This causes the light reflected by the mirror 46 to be reflected toward a direction in which an arrow 63, that is, toward a direction in which an angle of emittance from the signal transmitting optical antenna 30 is made larger when compared with that provided before the change by the controller 100.

If the light corrected by the second reflecting plane of the beam deflector 32 and reflected totally by the mirror 46 is emitted as the transmitting beam 53 from the signal transmitting optical antenna 30 having the same polarity as the signal receiving optical antenna 31 has, an event happens that the light is transmitted out in the direction shown by the arrow 60 which is a displaced direction of the receiving beam 36. Therefore, the polarity of the signal transmitting optical antenna 30 is changed so as to be opposite to that of the signal receiving optical antenna 31 which enables the reflected light emitted from the mirror 46 to be transmitted to the receiver in a corrected direction shown in an arrow 64. At this point, a beam diameter is expanded under same magnification as is applied to the signal receiving optical antenna 31. Thus, by making the diameter of the transmitting beam equal to that of the receiving beam 36, compatibility between the transmitter and receiver can be further improved.

In the spatial light communication equipment of the first embodiment, the angular error of the receiving beam 36 is detected by the angle detector 33 displaced on the optical axis of the light reflected by the first reflecting plane of the beam deflector 32 and, based on detected results, the angle deflected by the beam deflector 32 is corrected. Moreover, the deflected angle of the transmitting beam 53 is controlled by using the second reflecting plane which is the back-surface of the first reflecting plane of the beam deflector 32 and an error being equivalent to the angular error occurring in the receiving beam 36 is accurately corrected to obtain the correct direction of emittance of the transmitting beam 53 by using the signal transmitting optical antenna 30 having same magnification as the signal receiving optical antenna 31 has and having the polarity being opposite to the signal receiving optical antenna 31.

Thus, according to the first embodiment, a spatial separation between the transmitting beams 53 and receiving beams 36 within the spatial light communication equipment and complete blocking of an invasion of crosstalk of the transmitting beam 53 into the signal receiving system can be achieved, with very simplified configurations. Furthermore, by transmitting the transmitting beam 53 and receiving beam 36 on different optical axes, light having a same wavelength and same polarized component can be used between the transmitter and receiver, thus ensuring compatibility of the spatial light communication equipment.

Second Embodiment

Figure 5:
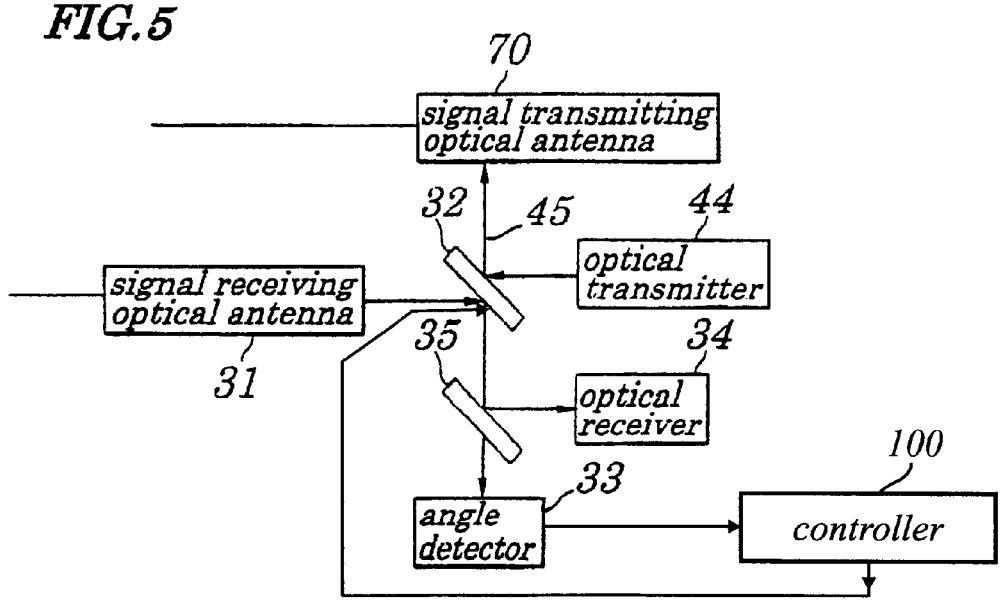
FIG. 5 is a schematic block diagram showing configurations of a spatial light communication equipment according to a second embodiment of the present invention.
Figure 6:
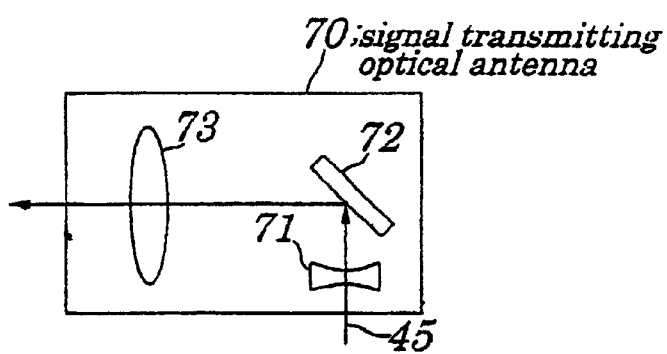
FIG. 6 is a diagram illustrating configurations of main parts of a signal transmitting optical antenna making up the spatial light communication equipment according to the second embodiment.

FIG. 5 is a schematic block diagram showing configurations of a spatial light communication equipment according to a second embodiment of the present invention. In FIG. 5, same reference numbers are assigned to parts having same functions as in the first embodiment in FIG. 1 and descriptions of them are omitted accordingly. The spatial light communication equipment of the second embodiment differs from that of the first embodiment in that a light 45 reflected by a beam deflector 32 is incident on a signal transmitting optical antenna 70 and a transmitting beam is transmitted out from the signal transmitting optical antenna 70. FIG. 6 is a diagram illustrating configurations of main parts of the signal transmitting optical antenna 70. As shown in FIG. 6, the signal transmitting optical antenna 70 includes a concave lens 71, a mirror 72 and a convex lens 73. The concave lens 71 is disposed on a light incidence side, the convex lens 73 is disposed on a light emittance side and the mirror 72 is disposed between these two lenses which are adapted to change a direction of an optical axis. That is, a mirror 72 is embedded in signal transmitting optical antenna 70 of the spatial light communication equipment of the second embodiment. This allows the concave lens 71 to be disposed as near to the beam deflector 32 as possible and reflected light to be handled in a vicinity of a center area where aberration of the concave lens 71 is small and further a lens diameter of the concave lens 71 to be made smaller.

Thus, according to the second embodiment, transmitting accuracy of the transmitting beam can be improved and size of the spatial light communication equipment can be made smaller.

Third Embodiment

Figure 7:
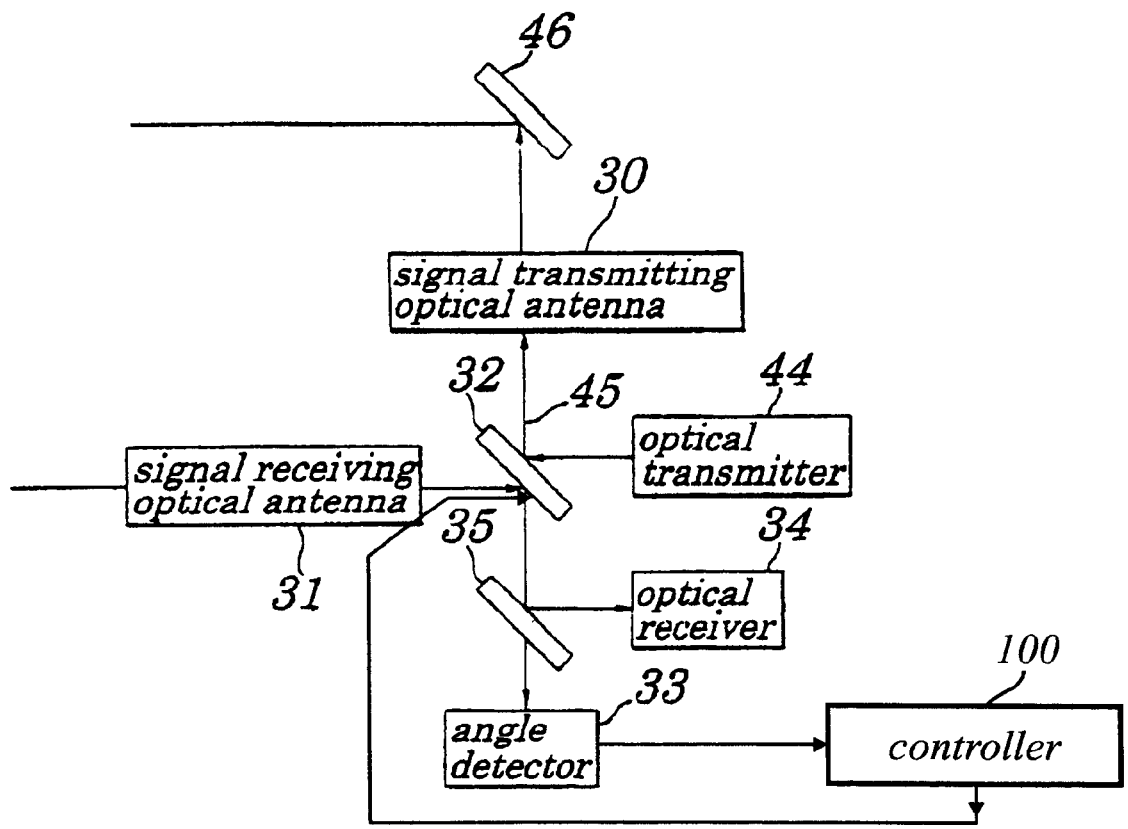
FIG. 7 is a schematic block diagram showing configurations of a spatial light communication equipment according to a third embodiment of the present invention.
Figure 8:
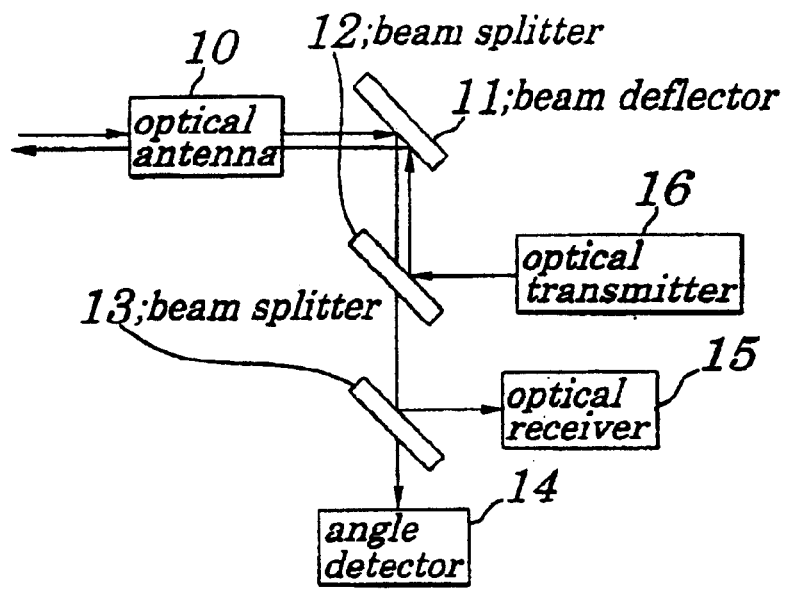
FIG. 8 is a schematic block diagram showing configurations of a conventional spatial light communication equipment in which communication using transmitting and receiving beams is carried out on a same optical axis.
Figure 9:
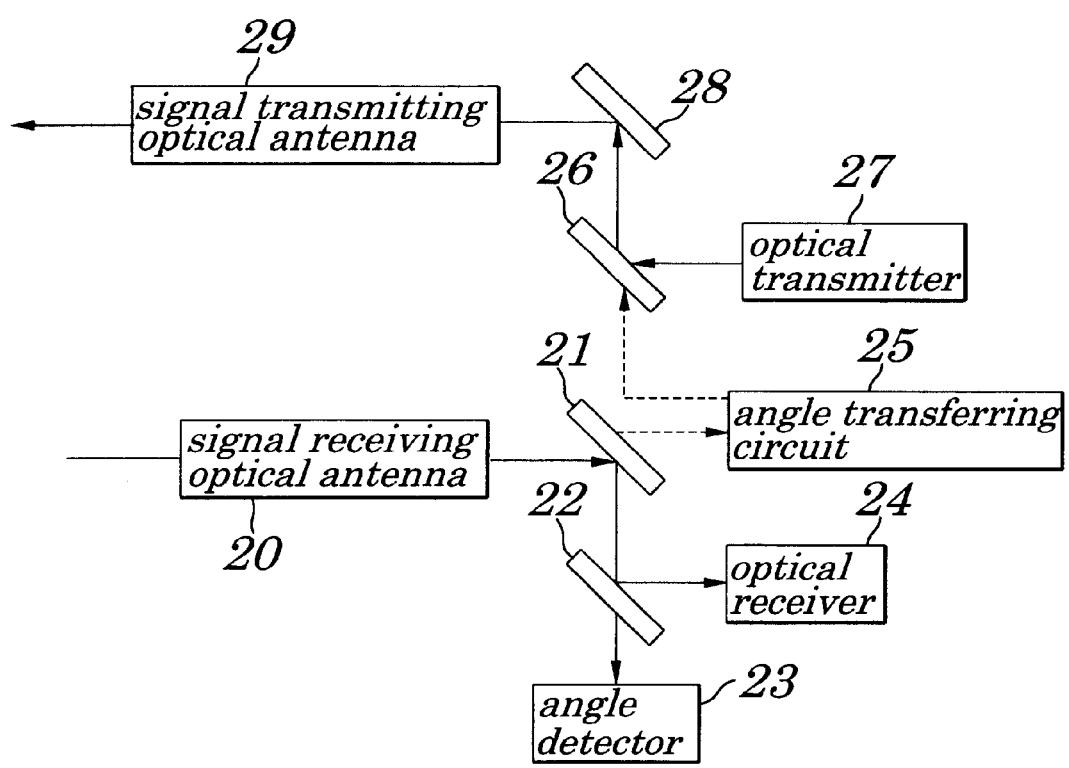
FIG. 9 is a schematic block diagram showing configurations of a conventional spatial light communication equipment in which communication is carried out by transmitting signal transmitting and receiving beams on different optical axes.

FIG. 7 is a schematic block diagram showing configurations of a spatial light communication equipment according to a third embodiment of the present invention. In FIG. 7, same reference numbers are assigned to parts having same functions as those in the first embodiment in FIG. 1 and descriptions of them are omitted accordingly.

In a spatial light communication equipment according to the second embodiment, a mirror is embedded in a signal transmitting optical antenna to achieve miniaturization of the spatial light communication equipment, however, costs become more costly compared with a case using commercially available optical antenna in some cases. To solve this problem, the spatial light communication equipment according to the third embodiment is so configured that light 45 reflected by a beam deflector 32 is incident on a signal transmitting optical antenna 30 and a transmitting beam transmitted out from the signal transmitting optical antenna 30 is totally reflected by a mirror 46 and an optical axis of the transmitting beam is changed. By configuring as above, the signal transmitting optical antenna 30 containing the concave lens 51 shown in FIG. 3 can be disposed as near to the beam deflector 32 as possible. This allows reflected light to be handled in a vicinity of a center area where aberration of the concave lens 51 is small and lens diameter of the concave lens 51 to be made smaller. Moreover, a commercially available signal transmitting optical antenna can be appropriated as it is.

Thus, according to the third embodiment, without increased costs for the spatial light communication equipment, transmitting accuracy of the transmitting beam can be improved and size of the spatial light communication equipment can be made smaller.

It is apparent that the present invention is not limited to the above embodiments but may be changed and modified without departing from the scope and spirit of the invention.

What is claimed is:

1. A spatial light communication equipment comprising:
    a first optical antenna for receiving spatial light from a remote spatial light source;
    a deflector for deflecting the received spatial light, the deflector having a first reflecting plane and a second reflecting plane, the first reflecting plane and the second reflecting plane being disposed on opposite sides of the deflector;
    a detector for detecting an angular deviation of the received spatial light relative to a specified optical axis;
    a controller for adjusting the first reflecting plane to correct the angular deviation of the received spatial light deflected by the first reflecting plane; and
    a second optical antenna optically coupled to the deflector for transmitting spatial light reflecting off the second reflecting plane;

wherein the second reflecting plane of the deflector is physically coupled to the first reflecting plane of the deflector and moves responsive to the adjustments made by the controller to the first reflecting plane.

2. The spatial light communication equipment according to claim 1, wherein the first optical antenna and the second optical antenna are operated at the same magnification.

3. The spatial light communication equipment according to claim 1, wherein the first optical antenna is capable of receiving spatial light of a given diameter and the second optical antenna is capable of transmitting spatial light of the same diameter.

4. The spatial light communication equipment according to claim 1, wherein the second optical antenna is capable of reversing the polarity of the spatial light received by the first optical antenna.

5. The spatial light communication equipment according to claim 1, wherein an exit pupil of the received spatial light is positioned on the first reflecting plane of the deflector.

6. The spatial light communication equipment according to claim 1, wherein the second reflecting plane moves in parallel with the movement of the first reflecting plane.

7. A spatial light communication equipment comprising:
a first optical antenna for receiving spatial light from a remote spatial light source;
a second optical antenna for transmitting spatial light to the remote spatial light source;
a deflector for deflecting the received spatial light, the deflector having a first reflecting plane which deflects the received spatial light and a second reflecting plane which deflects the transmitted spatial light, the first reflecting plane and the second reflecting plane being disposed on opposite sides of the deflector;
a detector for detecting an angular deviation of the received spatial light relative to a specified optical axis; and
a controller for correcting both the angular deviation of the received spatial light and the angular deviation of the transmitted spatial light as a function of the detected angular deviation of the received spatial light.

8. The spatial light communication equipment according to claim 7, wherein the first optical antenna and the second optical antenna are operated at the same magnification.

9. The spatial light communication equipment according to claim 7, wherein the first optical antenna is capable of receiving spatial light of a given diameter and the second optical antenna is capable of transmitting spatial light of the same diameter.

10. The spatial light communication equipment according to claim 7, wherein the second optical antenna is capable of reversing the polarity of the spatial light received by the first optical antenna.

11. The spatial light communication equipment according to claim 7, wherein an exit pupil of the received spatial light is positioned on the first reflecting plane of the deflector.

12. The spatial light communication equipment according to claim 7, wherein the second reflecting plane moves in parallel with the movement of the first reflecting plane.

13. A spatial light communication equipment comprising:
a first optical antenna for receiving spatial light from a remote spatial light source;
a deflector for deflecting the received spatial light, the deflector having a first reflecting plane which deflects the received spatial light and a second reflecting plane, the first reflecting plane and the second reflecting plane being disposed on opposite sides of the deflector;
a detector for detecting an angular deviation of the received spatial light relative to a specified optical axis;
a controller for adjusting the first reflecting plane to correct the angular deviation of the received spatial light deflected by the first reflecting plane;
an optical transmitter for emitting spatial light, wherein the emitted spatial light is incident on the second reflecting plane of the deflector;
a reflector for directing the spatial light reflected off the second reflecting plane; and
a second optical antenna for transmitting the spatial light reflected off the second reflecting plane.

14. The spatial light communication equipment of claim 13, wherein the reflector is positioned before the second optical antenna in the light path of the transmitted light.

15. The spatial light communication equipment of claim 13, wherein the second optical antenna is positioned before the reflector in the light path of the transmitted light.

16. The spatial light communication equipment of claim 13, wherein the reflector is positioned between a convex and a concave lens within the second optical antenna.

* * * * *